June 25, 1935.   E. E. DRAPER   2,005,777
STEREOSCOPIC PHOTOGRAPHY AND OBJECTIVE SYSTEM THEREFOR
Filed Aug. 8, 1930
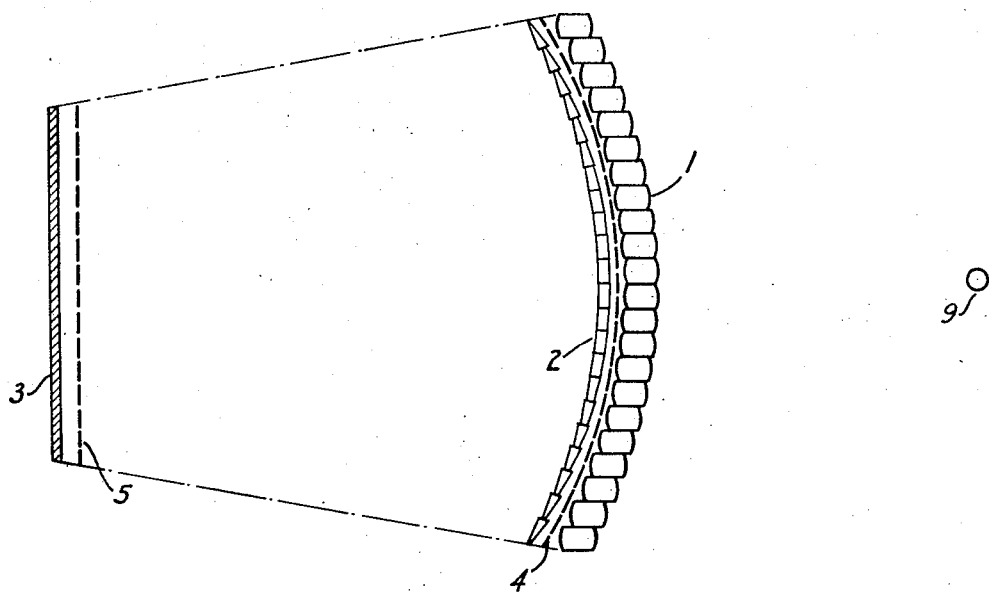
INVENTOR
*Ernest E. Draper*.
BY
*Harry Lea Dodson*
ATTORNEY Patented June 25, 1935

2,005,777

UNITED STATES PATENT OFFICE 2,005,777

STEREOSCOPIC PHOTOGRAPHY AND OBJECTIVE SYSTEM THEREFOR

Ernest E. Draper, Scarsdale, N. Y., assignor to The Perser Corporation, New York, N. Y., a corporation of New York Application August 8, 1930, Serial No. 473,929

14 Claims. (Cl. 95—5)

Attempts have been made, notably by Bessiere, to secure similar results by the employment of a large lens, the exposure in both cases being made through a screen formed of alternate opaque and transparent vertical lines. The result is the production of a negative consisting of a plurality of vertical images, the positive of which, when viewed with a vertical lined screen behind it, will be stereoscopic.

In French Patent 618,880, of March 22, 1927, issued to Societe D'Exploitation Des Brevets et Procedes Bessiere, the inventor suggests that the big lens of his French Patent 590,853, issued to the same corporation February 20, 1924, can be replaced by an aggregate of small lenses if equipped with optical reversers consisting of reflecting prisms or mirrors.

The present invention also employs an aggregate of small lenses and associated prisms, the objective system however being so designed and employed as to overcome two defects, one of which occurs in each of Bessiere's methods. In his first method, employing a single large lens, the picture obtained would be pseudoscopic if viewed with a viewing screen in front of it. It is therefore necessary to place the viewing screen behind it. Bessiere proposed to use a viewing screen identical with the taking screen. This results in faulty registration because the divergent rays from the lenses produce an image on the photographic plate of slightly larger spacing than the taking screen, whereas when the picture is viewed from a distance with the lined screen or other lineator behind it, to get perfect registration it is necessary that the picture should be slightly smaller than the viewing screen.

Bessiere's second device, involving the use of an aggregate of lenses equipped with reflecting prisms, overcomes this difficulty, because the reflection in the prisms reverses the image produced by each lens and renders the picture stereoscopic as viewed with a viewing screen in front of it. On the other hand, this second device introduces a serious new difficulty. While it is possible with respect to a single point in the object to arrange the prisms and lenses of Bessiere so that they all form an image of that point at the same place, it is also true that if there is another point in the field, any nearer the camera, than the other, the lenses produce an image of this which is farther away than the original image but the rays through the prisms are deflected in such a way as to come together closer to the objective. Therefore, for any point not in the plane for which the Bessiere apparatus was designed, it is impossible to obtain both good focus and coincidence of images. This is due to Bessiere's use of reflecting prisms. The difficulty therein just mentioned is overcome according to the present invention by employing refracting prisms involving no reflection.

A concrete embodiment of my invention is illustrated in the accompanying drawing, to be considered as a part of this specification, in which—

The figure shows a method of making stereoscopic negatives, by exposing a sensitized plate behind a screen consisting of alternate opaque and transparent vertical lines, the screen being slightly spaced from the plate, said exposure being made through a multiplicity of lenses and prisms.

Similar reference numerals refer to similar parts throughout the entire description.

As shown in the drawing, I locate a multiplicity of lenses 1 in the arc of a circle, preferably, so that those on the outer ends will "look around" the object to be photographed. These lenses 1 should all be of the same focal length, and so positioned that each lens 1 will receive rays from the same area and objects in the objective space, except for the variation due to the differing angle of view.

Adjoining the lenses 1, I locate a plurality of prisms 2, each of which is placed so as to superimpose the image from a lens 1, thrown upon a sensitized plate 3, exactly upon all the images from the other lenses 1, except where the images differ on account of the different angles of view. This requires that the prisms should have greater light-deflecting power the further they are located from the axis of the system. Increase of light-deflecting power is commonly obtained by increasing the prism angle; it may also be obtained by using glass of higher refractive index. The lenses 1 should preferably each be oriented in such a direction that it is perpendicular to the central ray of light passing through the lens, since this condition is most favorable to the formation of clear image. The prisms 2 are employed not to reverse the images, but to cause the various images to coincide except as they differ slightly as the result of different viewing angles.

Suitable diaphragms 4 are provided for the lenses 1, and a screen 5 is spaced in front of the plate 3, whereby a multiplicity of vertical panel images is produced.

If the positive made from the negative thus provided were viewed without a viewing screen behind it, it would not be stereoscopic but pseudoscopic, but if a viewing screen is placed behind it, the result produced by the light source 9 will be stereoscopic.

However, if the viewing screen is identical with the taking screen, as called for by Bessiere, the picture will be distorted, and may present a moiré pattern. This is due to the fact that the panel images on the negative are wider than the transparent lines of the screen 5, owing to the spacing of the latter from the plate 3 producing fewer image panels for each strip than the number of lines in the screen; hence the viewing screen must be made so that its transparent spaces will exactly match, not the taking screen, but the image panels on the negative. If, then, the positive is viewed with such a screen behind it, the result will be stereoscopic.

From the foregoing, it will be apparent, to persons skilled in the art, that I can produce a "Depthograph" without the use of moving parts or camera, or the expense of large lens, which obviously imposes limitations upon the size of the object to be photographed.

Having described my invention, what I regard as new, and desire to secure by Letters Patent of the United States, is:

1. The method of making a stereoscopic picture, comprising making a single exposure of a stationary sensitized plate, through a multiplicity of lenses mounted in an arc of a circle, said exposure being made through a screen composed of alternate opaque and transparent vertical lines, a corresponding number of prisms arranged directly behind the lenses and intermediate the lenses and the line screen to superimpose the multiple images on said plate exactly upon all the images from all the lenses, except where they differ on account of the angle of view.

2. The method of making a stereoscopic picture, comprising making a single exposure of a stationary sensitized plate, through a screen composed of alternate opaque and transparent vertical lines, spaced from said plate, a multiplicity of lenses mounted in an arc of a circle, a corresponding number of prisms arranged directly behind the lenses and intermediate the lenses and the line screen to superimpose the multiple images on said plate exactly upon all the images from all the lenses, except where they differ on account of the angle of view.

3. The method of making a stereoscopic picture, comprising making a single exposure of a stationary sensitized plate through a screen composed of alternate opaque and transparent vertical lines, spaced from said plate, a multiplicity of lenses mounted in an arc of a circle, said lenses being toed in so they all point to a common point, a corresponding number of prisms arranged directly behind the lenses and intermediate the lenses and the line screen to superimpose the multiple images on said plate exactly upon all the images from all the lenses, except where they differ on account of the angle of view.

4. The method of making positives comprising the following steps; exposing a sensitized photographic emulsion through a multiplicity of lenses and prisms, the prisms being located behind the lenses and in arrangement to cause a multiplicity of strip images of the object to be photographed to be juxtaposed on said emulsion, interposing between said sensitized photographic emulsion and the prisms, a line screen composed of alternate, opaque and transparent vertical lines, exposing a sensitized emulsion to light transmitted through the negative thus formed, thereby forming a positive of identical size which presents a stereoscopic picture when viewed by transmitted light with a vertical line positive screen behind it, said screen consisting of alternate, opaque and transparent lines which coincide with the strip images on the negative.

5. In an apparatus for juxtaposing a multiplicity of panel images upon a sensitized plate, a screen composed of alternate transparent and opaque lines a multiplicity of lenses juxtaposed horizontally, an equal number of prisms which refract without reflecting, located adjacent said lenses so positioned as to superimpose the multiplicity of complete images on said plate through said screen composed of alternate opaque and transparent vertical lines so spaced from said plate that when exposure is made through said screen, the images produced on the plate by the multiplicity of lenses will be juxtaposed in panel form.

6. An apparatus for producing relief pictures comprising an array of lenses, arranged horizontally, approximately edge to edge in a horizontal row, transverse to the direction of said object, an array of refracting non-reflecting prisms one of which is optically associated with each lens, said prisms each having such light-deflecting power that the images formed by said lenses are located in substantially the same place, a surface adapted to abut a light sensitive surface, and a screen interposed between said lenses and said light sensitive surface, and a lineating screen interposed between said lenses and said light sensitive surface adapted to distribute the light from each lens to an essentially separate linear area of said plate.

7. An apparatus for producing relief pictures comprising an array of lenses arranged horizontally approximately edge to edge in a horizontal row, transverse to the direction of said object, an array of refracting non-reflecting prisms one of which is optically associated with each lens, said prisms each having such light-deflecting power that the images formed by said lens are located in substantially the same place, a surface adapted to abut a photographic plate, and a screen composed of alternate, transparent and opaque lines interposed between said lenses and said photographic plate.

8. A method of making a stereoscopic picture comprising, arranging a multiplicity of lenses horizontally, combining with each lens a refracting, non-reflecting prism so placed and shaped that the images formed by said lenses are located in substantially the same place, placing a sensitized plate in this place, intervening a lined screen between said plate and said lenses at such distance from said plate as to juxtapose panel elements of the superimposed images onto said plate and making an exposure thereon.

9. An apparatus for producing relief pictures comprising an array of lenses arranged horizontally approximately edge to edge in a horizontal row, transverse to the direction of said object, an array of refracting non-reflecting prisms, one of which is optically associated with such lens, said prisms each having such light-deflecting power that the images formed by said lenses are located in substantially the same place, a surface adapted to abut a photographic plate, and a transparent lineated screen interposed between said lenses and said photographic plate.

10. Image forming means adapted to focus in substantially the same place, a plurality of images corresponding to different angular aspects of an object comprising, an array of lenses arranged horizontally approximately edge to edge in a horizontal row transverse to the direction of said object, and an array of refracting, non-reflecting prisms, one of which is optically associated with each lens, said prisms having such light-deflecting power that the images formed by said lenses are located in substantially the same place.

11. The stereoscopic objective system, adapted to focus in substantialy the same place, a plurality of images corresponding to different angular aspects of an object, comprising an array of lenses arranged horizontally approximately edge to edge in a horizontal row transverse to the direction of said object, and an array of refracting, non-reflecting prisms, one of which is optically associated with each lens, said prisms having such light-deflecting power that the images formed by said lenses are located in substantially the same place.

12. Image forming means adapted to focus in substantially the same place, more than two images corresponding to different angular aspects of an object, comprising an array of lenses arranged horizontally approximately edge to edge in a horizontal row transverse to the direction of said object, an array of refracting, non-reflecting prisms, one of which is optically associated with each lens, said prisms having such light-deflecting power that the images formed by said lenses are located in substantially the same place.

13. An apparatus for producing relief pictures comprising an array of lenses arranged horizontally approximately edge to edge in a horizontal row, transversed to the direction of said object, an array of refracting non-reflecting prisms one of which is optically associated with each lens, said prisms each having such light-deflecting power that the images formed by said lenses are located in substantially the same place, a surface adapted to abut a photographic plate, and a screen interposed between said lenses and said photographic plate adapted to distribute the light from each lens to an essentially separated area of said plate.

14. An apparatus for producing relief pictures comprising an array of lenses, arranged horizontally, approximately edge to edge in a horizontal row, transverse to the direction of said object, an array of refracting non-reflecting prisms one of which is optically associated with each lens, said prisms each having such light-deflecting power that the images formed by said lenses are located in substantially the same place, diaphragms located intermediate said lenses and said prisms, a photographic plate, and a screen interposed between said lenses and said photographic plate, and a lineating screen interposed between said lenses and said light sensitive surface adapted to distribute the light from each lens to an essentially separate linear area of said plate.

ERNEST E. DRAPER.